United States Patent
Roncero Blazquez

(10) Patent No.: US 10,118,285 B2
(45) Date of Patent: Nov. 6, 2018

(54) INTERCHANGEABLE CAP FOR THE STORAGE OF TOOLS WITH A HANDLE

(71) Applicant: Jaime Jose Roncero Romero, Las Matas (Las Rozas) (ES)

(72) Inventor: Jose Maria Roncero Blazquez, Madrid (ES)

(73) Assignee: Jaime Jose Roncero Romero, Las Matas (Las Rozas) (ES)

( * ) Notice: Subject to any disclaimer, the term of this patent is extended or adjusted under 35 U.S.C. 154(b) by 0 days.

(21) Appl. No.: 15/568,329

(22) PCT Filed: Apr. 21, 2016

(86) PCT No.: PCT/ES2016/070288
§ 371 (c)(1),
(2) Date: Oct. 20, 2017

(87) PCT Pub. No.: WO2016/170217
PCT Pub. Date: Oct. 27, 2016

(65) Prior Publication Data
US 2018/0133888 A1    May 17, 2018

(30) Foreign Application Priority Data
Apr. 21, 2015  (EP) .................................... 15382197

(51) Int. Cl.
*A47G 29/00*  (2006.01)
*B25G 1/08*  (2006.01)
(Continued)

(52) U.S. Cl.
CPC ................ *B25G 1/08* (2013.01); *A47L 13/51* (2013.01); *A47L 13/512* (2013.01); *B25G 1/00* (2013.01);
(Continued)

(58) Field of Classification Search
USPC ......................................................... 248/683
See application file for complete search history.

(56) References Cited

U.S. PATENT DOCUMENTS 3,096,960 A * 7/1963 Kinney ................. A47L 13/512
                                                     248/113
3,197,169 A * 7/1965 Burrows ............... A47L 13/512
                                                     248/111
(Continued)

FOREIGN PATENT DOCUMENTS

| CH | 345 988 | 4/1960 |
| WO | WO 2012/146806 | 11/2012 |

OTHER PUBLICATIONS

International Search Report issued by the International Searching Authority (ISA/O.E.P.M.) dated Aug. 2, 2016 in connection with International Application No. PCT/ES2016/070288.

*Primary Examiner* — Monica E Millner
(74) *Attorney, Agent, or Firm* — Gary J. Gershik; Cooper & Dunham LLP

(57) ABSTRACT

The present invention relates to a cap of the type used for being attached to shafts or handles (1) of implements, such as cleaning implements, and coupleable to different types of handles (1), thereby preventing the need to have different sized and shaped caps, basically comprising an elongated and hollow tubular body, an upper end (2), an open lower end (3) for at least partially housing therein the free end of the handle (1) of an implement, a magnet (4) for attaching it to a hanging surface (9) and progressive adjustment means for adjusting it to the outer contour of said handle (1).

20 Claims, 4 Drawing Sheets

(51) Int. Cl.
*A47L 13/512* (2006.01)
*B25G 1/00* (2006.01)
*A47L 13/51* (2006.01)
*F16B 1/00* (2006.01)

(52) U.S. Cl.
CPC ........ *F16B 1/00* (2013.01); *F16B 2001/0035* (2013.01)

(56) References Cited

U.S. PATENT DOCUMENTS

| | | | | |
|---|---|---|---|---|
| 4,867,360 A | * | 9/1989 | Howard | A47L 13/51 224/148.4 |
| 5,368,203 A | * | 11/1994 | Friedrich | A47G 19/24 206/818 |
| 6,669,031 B1 | * | 12/2003 | Badonic | A47K 1/09 211/66 |
| 8,701,924 B2 | * | 4/2014 | Dalbec | B65D 51/24 220/480 |
| 2013/0306815 A1 | * | 11/2013 | Roncero Blazquez | A47L 13/51 248/206.5 |
| 2015/0239116 A1 | * | 8/2015 | Niccolai | B25G 1/046 15/145 |
| 2016/0016306 A1 | * | 1/2016 | Haddon | B25H 3/04 211/70.6 |

\* cited by examiner

INTERCHANGEABLE CAP FOR THE STORAGE OF TOOLS WITH A HANDLE

RELATED APPLICATIONS

This application is a § 371 national stage of PCT International Application No. PCT/ES2016/070288, filed Apr. 21, 2016, claiming priority of European Patent Application EP15382197.0, filed Apr. 21, 2015 the contents of each of which are hereby incorporated by reference into this application.

TECHNICAL FIELD OF THE INVENTION

The object of the present invention is a cap of the type attached to shafts or handles of implements, for example conventional cleaning implements such as brooms, brushes, mops, etc. and, specifically to those caps incorporating a magnet whereby allowing their comfortable, rapid and easy securing to a metal surface arranged for that purpose on a wall, inside a cupboard, etc.

More specifically, the cap of the invention has means so that it can be coupled to different shafts or handles, thereby preventing the need to have different sized caps with the forethought that the diameters of said shafts or handles may not be conventional diameters.

BACKGROUND OF THE INVENTION

As is known, implements having a considerably long gripping handle are usually stored when they are not being used, generally hidden from the view in rooms particularly intended for that purpose or in adapted cupboards, as is the case, for example, with certain tools or implements normally used for cleaning, such as brooms, mops, etc.

Given the features of such implements, the problem involved with storing them without them taking up too much space and in a clean and orderly manner is also known. To avoid these problems, there are caps such as the one described in WO2012146806, for example, belonging to the same inventor as the present application.

Said document describes caps in the upper and inner part of which there is housed a magnet such that once such caps are placed on the corresponding handles of cleaning implements, the latter can be "stuck" to either a vertical or horizontal metal or magnetic surface provided, for example, on an inner wall, the ceiling or the door of a cupboard.

However, even though these caps are able to provide any implement having a handle with the means necessary for being easily and comfortably storable, sometimes problems arise as a result of a lack of standardization of said handles.

Specifically, said handles usually have a constant circular section, but at the same time this may change from one handle to another according to the manufacturer, country, material, etc., or they may even have a polygonal shape.

This means that a cap with a magnet such as the one described may not be valid for all handles, even if it is elastic in nature, or in other words, said cap may not be able to be coupled to some of the handles conventionally used or it may not fit well enough to withstand the weight of the implement when it is hanging, causing the cap to come off and said implement to therefore fall.

Furthermore, on other occasions, if the outer diameter of the handle of the implement is very similar to the inner diameter of the cap, it is quite difficult to introduce the elastic cap, which may even prevent being able to remove it once it has been coupled without being damaged if the cleaning implement or just the handle thereof is to be disposed of, which usually occurs when said handle breaks or bends due to the application of excessive force.

In those cases, therefore, it is necessary to provide a cap with a design such that it can be interchangeable between different handles and can be hung and removed without too much effort, while at the same time maintains sufficient attachment force once it is coupled to the handle to prevent the handle to which it is coupled from becoming disengaged due to the weight of the assembly when it is in the non-operative phase, i.e., when it is hanging from the ceiling or a wall as a result of the effect of the magnet.

DESCRIPTION OF THE INVENTION

The present invention relates to an interchangeable cap for storing implements with a handle that solves the aforementioned problems of the state of the art, forming a versatile element that can be easily coupled to different handles, for example handles of cleaning implements, while at the same time also allows comfortably removing the handle from said implement due to its design.

Specifically, the interchangeable cap of the invention comprises on the inside thereof progressive adjustment means for adjusting it to outer contour of the handle of the implement or tool to which it is going to be coupled, such that one and the same cap is suitable for different outer handle diameters.

DESCRIPTION OF THE DRAWINGS

To complement the description that is being made and for the purpose of aiding to better understand the features of the invention according to a preferred and practical embodiment thereof, a set of drawings is attached as an integral part of the description in which the following has been depicted with an illustrative and non-limiting character.

PREFERRED EMBODIMENT OF THE INVENTION

Figure 1:
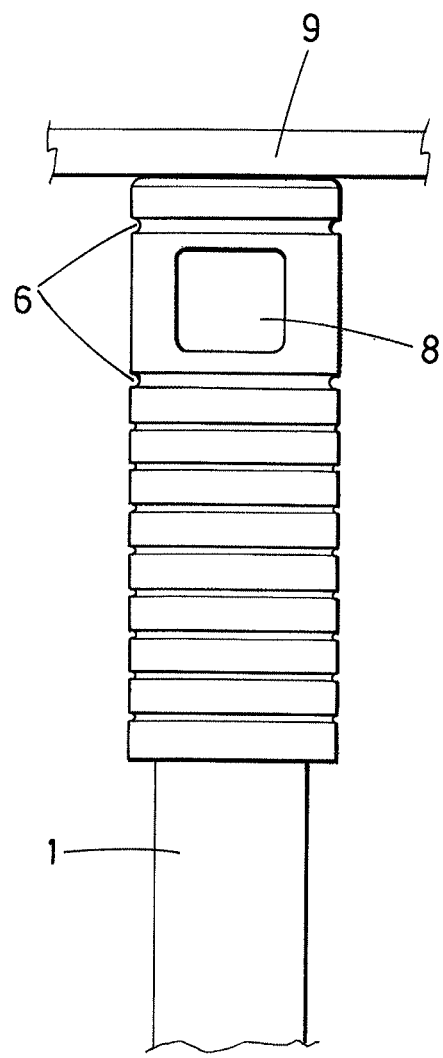
FIG. 1 shows an elevational view of the cap of the invention in the operative mode, placed on a handle and anchored to a metal surface as a result of the magnet of the inner part thereof.

In view of the described drawings, a preferred embodiment of the interchangeable cap of the present invention can be seen which is intended, as previously stated, for being attached to the handle (1) of an implement, particularly to a cleaning implement, such as, for example, but without being limited to, a broom, a dustpan or a mop.

As can be seen in the drawings, the cap of the invention comprises an elongated and hollow tubular body with an upper end (2) and an open lower end (3) for at least partially housing therein the free end of the handle (1) of the implement.

On the other hand, the cap comprises at least one magnet (4) intended for attaching said cap, and therefore the handle (1) of the cleaning implement to which it is coupled, to an external metal object (9) such as a plate or another complementary magnetic object fixed to the desired surface, for example an inner surface in a cupboard. Therefore, as previously explained, storage of the cleaning implement is improved and aided.

Figure 2:
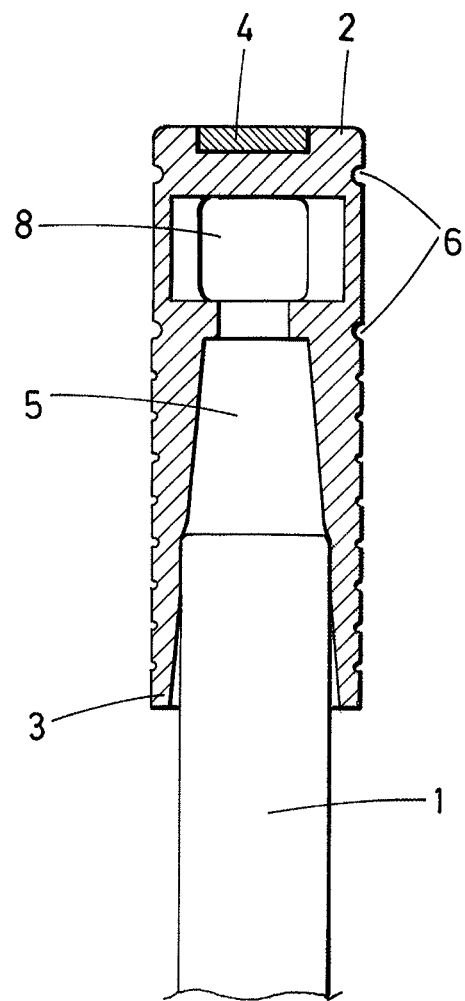
FIG. 2 shows a sectioned elevational view of the cap of the invention shown in the previous figure such that the progressive adjustment means for adjusting it to the handle of the implement to which it is coupled are shown.

As can be seen in the embodiment shown in the drawings, particularly in FIG. 2, the magnet (4), which may be circular shaped or shaped in other forms, is incorporated such that it is embedded within the upper end (2) of the cap, housed in a hole that said upper end (2) has for that purpose, such that the face of the magnet (4) intended for being attached to the hanging surface does not project with respect to the mentioned upper end of the cap, being flush with the outer surface of said upper end (2). Interferences or blows with the magnet that may damage it, or in a worst case scenario even rip it off the cap, are thereby prevented.

Nevertheless, according to another possible embodiment not shown in the drawings, the magnet (4) can be incorporated in cap embedded at any point of its side surface, being flush with the surface thereof, for those cases in which the implement is to be stored exclusively by magnetically "sticking" its handle (1) to a vertical wall instead of to an upper horizontal wall or ceiling.

Likewise, according to another possible embodiment, the magnet (4) may also be only partially embedded in the cap, such that the face of said magnet (4) intended for being attached to the hanging surface projects from the outer surface thereof, for example, to assure better contact with walls or ceilings that are not perfectly smooth and/or uniform.

On the other hand, though not depicted either, the interchangeable cap of the invention can have other embodiments in which the magnet (4) or magnets are arranged on the inside thereof, without them being visible from the outside, for which purpose the thickness of said cap and/or the strength of the magnetic material used (for example neodymium, samarium-cobalt, etc.) for making the magnet (4) must be such that they allow securing the implement to an outer wall or ceiling to allow the functionality as defined above.

Likewise, though not shown in the drawings, the interchangeable cap of the invention can be attached to the magnet (4) or magnets by means of different means such as, for example, adhesive, threading, press fit, screwing, etc.

Furthermore, in an essential manner and according to a possible embodiment shown in FIG. 2, the cap of the invention comprises on the inside thereof, in correspondence with the area in which the free end of the handle (1) of the implement or tool to which it is going to be coupled can be housed, progressive adjustment means for adjusting it to the outer contour of said handle (1), such that the hollow part of said cap is fitted to said handle (1) in both the assembly or mounting operation and in the disassembly operation.

Therefore, as explained above, as a result of said progressive adjustment means the cap of the invention may be fitted not only to handles (1) with different diameters, but even to handles the cross-section of which is not a circle, but rather, for example, a polygon, such as a hexahedron, octahedron, etc.

As seen in the drawings, according to the preferred embodiment shown, the cap of the invention comprises on the inside thereof an elastic and hollow conical body (5) as progressive adjustment means, its largest diameter being in the area close to the lower end (3) forming the opening of the cap with respect to the handle (1) and its smallest diameter being in the area close to the upper end (2), such that said hollow conical body (5) has a diameter that progressively decreases from the area closest to said lower end (3) to the area closest to said upper end (2).

The inner conical elastic surface or hollow conical body (5) will therefore allow engaging different types of handles (1) existing on the market, which will result in evident economic savings and versatility. Furthermore, given that its lower end (3) has the largest diameter of the hollow conical body (5), this will aid in the task of the opening or coupling of the handle (1).

On the other hand, according to a possible practical embodiment not shown in the drawings, the cap may comprise a series of through cavities or recesses on its surface such that the amount of material is decreased, which in addition to constituting obvious savings, will also allow provide same with certain added elasticity which will aid in the coupling of the handle (1) on the inside thereof.

Furthermore, according to another possible embodiment, the cap may be made up of different materials in its outer surface and in its inner surface. So, for example, while the inner surface, and more specifically the hollow conical body (5), are made of an elastic material, the outer surface of the cap intended for being gripped by the user may or may not be made of a harder material than that of the inner surface, even a rigid material, in which case both inner and outer surfaces may be attached by any conventional system, for example by overmolding of plastic materials.

Likewise, the outer shape of the cap may be cylindrical or be of any other capricious shape, such as, for example, partially conical and parallel to the hollow conical body (5) of the inner part thereof, or of any other shapes according to aesthetic and/or ergonomic requirements.

Figure 3:
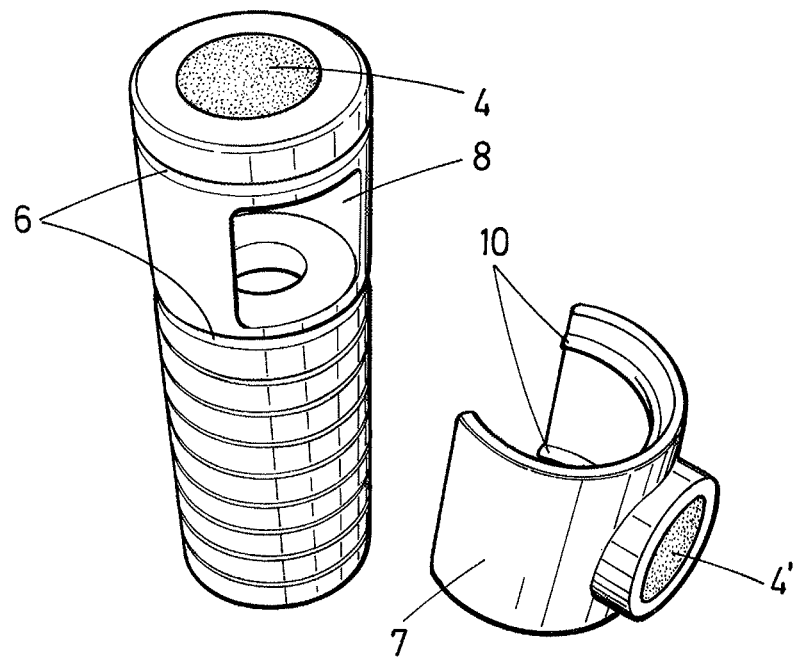
FIG. 3 shows several perspective views of an embodiment of the invention in which the cap comprises an accessory intended for allowing the sticking thereof to vertical surfaces.
Figure 3:
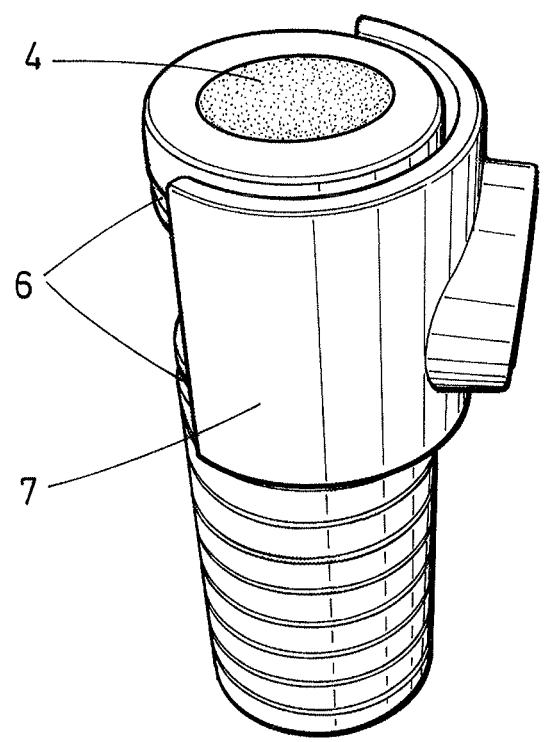
Figure 4:
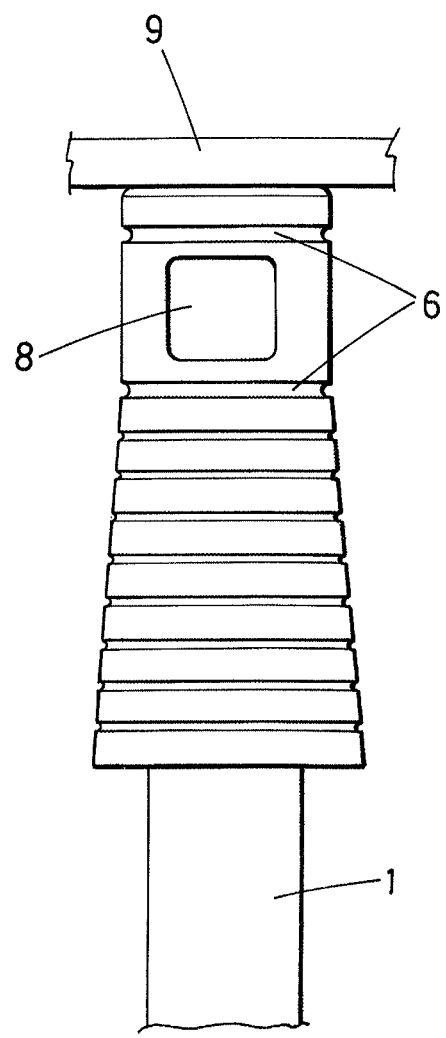
FIG. 4 finally shows an elevational view of a possible embodiment of the invention where the cap has a conical outer shape.

Furthermore, the cap of the invention can have at least one pair of outer circumferential grooves (6) intended for the coupling of complementary ridges (10) included in an accessory (7) which furthermore comprises an additional magnet (4') intended for allowing the sticking thereof to vertical surfaces, as shown in FIG. 3, for example, for those cases in which the cap is provided exclusively for being stuck to horizontal surfaces such as ceilings, or in cases in which even though the cap already incorporates a magnet on its side surface, it may be of interest given the features of the implement or of its surrounding area to have an additional second magnet (4').

Finally, the cap of the invention may incorporate a through hole (8) in correspondence with its upper end (2) and such that it does not intersect the hollow conical body (5) intended for housing the edge of the handle (1), which through hole (8) may be used to hang the cleaning implement in a conventional manner from a peg, hook, etc.

The invention claimed is:

1. Interchangeable cap for storing implements with a handle (1) comprising:
    an elongated and hollow tubular body,
    an upper end (2),
    an open lower end (3) for at least partially housing therein the free end of the handle (1) of an implement, and
    at least one magnet (4) characterized in that on the inside thereof, in correspondence with the area in which the free end of the handle (1) of the implement can be housed, it comprises progressive adjustment means for adjusting it to the outer contour of said handle (1).

2. Interchangeable cap according to claim 1, characterized in that it comprises an elastic and hollow conical body (5) as progressive adjustment means, its largest diameter being in the area close to the lower end (3) forming the opening of the cap with respect to the handle (1) and its smallest diameter being in the area close to the upper end (2).

3. Interchangeable cap according to claim 1, characterized in that at least one magnet (4) is located in the upper end (2).

4. Interchangeable cap according to claim 1, characterized in that at least one magnet (4) is located on its side surface.

5. Interchangeable cap according to claim 1, characterized in that at least one magnet (4) is embedded therein such that the face of said magnet (4) intended for being attached to the hanging surface (9) is flush with the outer surface of the cap.

6. Interchangeable cap according to claim 1, characterized in that at least one magnet (4) is only partially embedded therein such that the face of said magnet (4) intended for being attached to the hanging surface (9) projects with respect to the outer surface of the cap.

7. Interchangeable cap according to claim 1, characterized in that it comprises at least one magnet (4) on the inside thereof, without it being visible from the outside.

8. Interchangeable cap according to claim 1, characterized in that it comprises through cavities or recesses on its outer surface.

9. Interchangeable cap according to claim 1, characterized in that it is made up of different materials in its outer surface and in its inner surface.

10. Interchangeable cap according to claim 9, characterized in that its outer surface is made of a harder material than the inner surface forming the hollow conical body (5).

11. Interchangeable cap according to claim 1, characterized in that the outer shape of the cap is at least partially conical and parallel to the hollow conical body (5) of the inner part thereof.

12. Interchangeable cap according to claim 1, characterized in that it comprises a pair of outer circumferential grooves (6) intended for the coupling of complementary ridges (10) included in an accessory (7) which in turn comprises an additional magnet (4').

13. Interchangeable cap according to claim 1, characterized in that it comprises a through hole (8) in correspondence with its upper end (2) such that it does not intersect the hollow conical body (5).

14. Interchangeable cap according to claim 2, characterized in that at least one magnet (4) is located in the upper end (2).

15. Interchangeable cap according to claim 2, characterized in that at least one magnet (4) is located on its side surface.

16. Interchangeable cap according to claim 4, characterized in that at least one magnet (4) is embedded therein such that the face of said magnet (4) intended for being attached to the hanging surface (9) is flush with the outer surface of the cap.

17. Interchangeable cap according to claim 4, characterized in that at least one magnet (4) is only partially embedded therein such that the face of said magnet (4) intended for being attached to the hanging surface (9) projects with respect to the outer surface of the cap.

18. Interchangeable cap according to claim 4, characterized in that it comprises at least one magnet (4) on the inside thereof, without it being visible from the outside.

19. Interchangeable cap according to claim 11, characterized in that it comprises a pair of outer circumferential grooves (6) intended for the coupling of complementary ridges (10) included in an accessory (7) which in turn comprises an additional magnet (4').

20. Interchangeable cap according to claim 13, characterized in that it comprises a through hole (8) in correspondence with its upper end (2) such that it does not intersect the hollow conical body (5).

* * * * *